US012494600B2

(12) United States Patent
Huang et al.

(10) Patent No.: US 12,494,600 B2
(45) Date of Patent: Dec. 9, 2025

(54) TERMINAL AND A CONNECTOR

(71) Applicant: Tyco Electronics (Shanghai) Co., Ltd., Shanghai (CN)

(72) Inventors: Yongjian (Justin) Huang, Shanghai (CN); Tongbao (Tim) Ding, Shanghai (CN); Wenfang (Felix) Zhang, Shanghai (CN)

(73) Assignee: Tyco Electronics (Shanghai) Co., Ltd., Shanghai (CN)

( * ) Notice: Subject to any disclaimer, the term of this patent is extended or adjusted under 35 U.S.C. 154(b) by 438 days.

(21) Appl. No.: 17/940,401

(22) Filed: Sep. 8, 2022

(65) Prior Publication Data

US 2023/0076375 A1 Mar. 9, 2023

(30) Foreign Application Priority Data

Sep. 8, 2021 (CN) ........................ 202111036605.2

(51) Int. Cl.
*H01R 13/11* (2006.01)

(52) U.S. Cl.
CPC ............ *H01R 13/11* (2013.01); *H01R 13/111* (2013.01)

(58) Field of Classification Search
CPC .............................................. H01R 13/11–115
See application file for complete search history.

(56) References Cited

U.S. PATENT DOCUMENTS 3,753,193 A * 8/1973 Teagno ................ H01R 13/428
439/854

* cited by examiner

*Primary Examiner* — Ross N Gushi
(74) *Attorney, Agent, or Firm* — Barley Snyder

(57) ABSTRACT

A terminal includes a bottom wall having a through hole, a pair of sidewalls disposed on a pair of sides of the bottom wall, and a first elastic arm extending from a first side of the through hole in a direction away from the bottom wall. The sidewalls and the first elastic arm contact a pin inserted into the through hole.

11 Claims, 13 Drawing Sheets

TERMINAL AND A CONNECTOR

CROSS-REFERENCE TO RELATED APPLICATIONS

This application claims the benefit of the filing date under 35 U.S.C. § 119(a)-(d) of Chinese Patent Application No. 202111036605.2, filed on Sep. 8, 2021.

FIELD OF THE INVENTION

The present disclosure relates to the field of electronic connection accessories, and in particular to a terminal and a connector.

BACKGROUND

As shown in FIGS. 1*a*-1*b*, the structure of existing terminals (e.g., Cluster Block series) includes a crimping portion 110 for connecting cables and a socket portion 120 for inserting pins. The socket portion 120 has a bottom wall 121 and a pair of sidewalls 122. A through hole 1211 is provided on the bottom wall. When the pin is inserted into the socket portion 120 through the through hole 1211, the pair of sidewalls 122 exert pressure and provide the contact surface such that the pin contacts and electrically couples with the socket portion 120 after the pin is inserted into the socket portion 120. However, to meet the demands of the market for continuous miniaturization of products and to reduce manufacturing cost, there is an urgent need to improve existing terminals.

SUMMARY

A terminal includes a bottom wall having a through hole, a pair of sidewalls disposed on a pair of sides of the bottom wall, and a first elastic arm extending from a first side of the through hole in a direction away from the bottom wall. The sidewalls and the first elastic arm contact a pin inserted into the through hole.

BRIEF DESCRIPTION OF THE DRAWINGS

The features, advantages, and other aspects of various embodiments of the present disclosure will become more apparent with reference to the following detailed description and in connection with drawings, several embodiments of the present disclosure are shown by way of example and not limitation, in the drawings.

DETAILED DESCRIPTION OF THE EMBODIMENTS

Figure 1A:
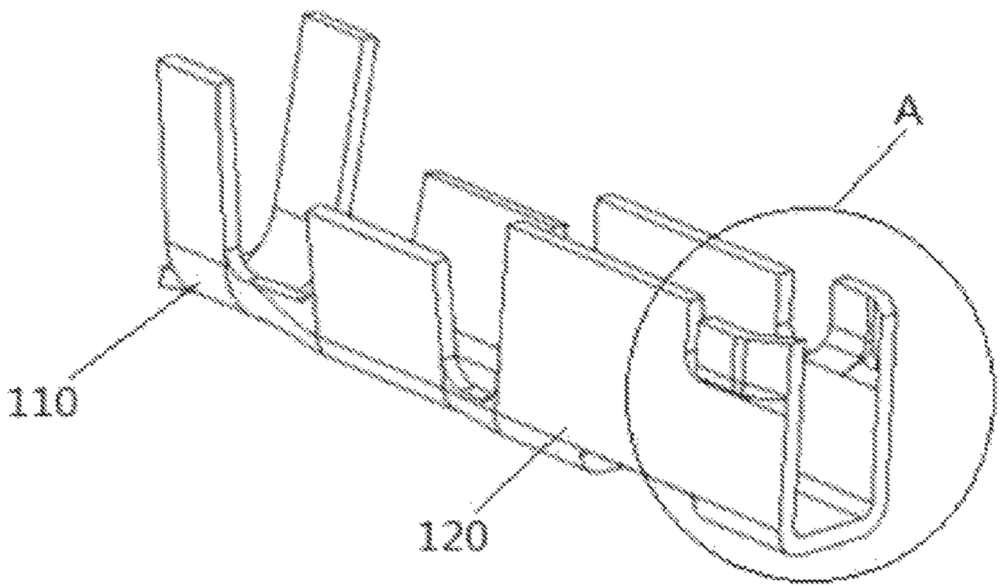
FIG. 1*a* is a perspective view of a terminal according to the prior art.
Figure 1B:
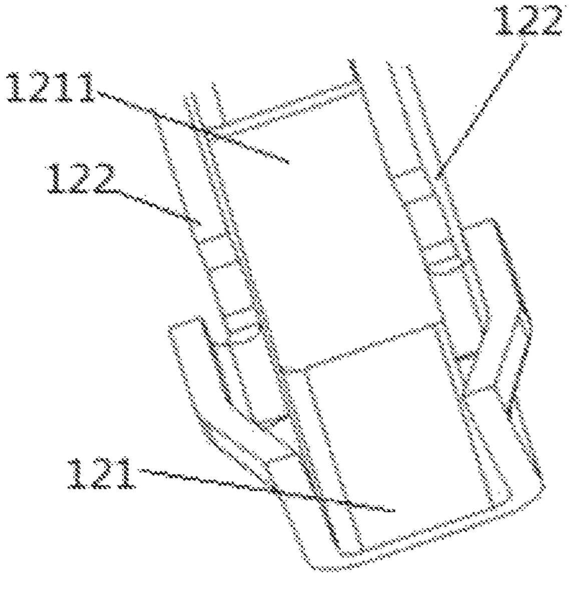
FIG. 1*b* is a detail perspective view of the terminal of FIG. 1*a;*

The technical solution of the present invention will be specifically described by way of embodiments and with reference to the accompanying drawings. In the specification, the same or similar reference numerals indicate the same or similar parts. The description of the embodiments of the present invention with reference to the accompanying drawings is intended to explain the general inventive concept of the present invention, and should not be construed as a limitation of the present invention.

The terms "comprising", "including", and the like, as used herein, should be understood to mean an open term, that is, "comprising/including, but not limited to", meaning that other items may also be included. The term "based on" is "based at least in part on." The term "one embodiment" means "at least one embodiment"; the term "another embodiment" means "at least one additional embodiment", and the like.

The present invention mainly focuses on the following technical problems: how to increase the current transmission paths and the stability of contact in the case of reducing the manufacturing cost.

To solve the above problems, the present invention discloses a terminal including: a bottom wall, a pair of sidewalls respectively disposed on both sides of the bottom wall, and a first elastic arm. The bottom wall is provided with a through hole, wherein the through hole is used for inserting the pin; the first elastic arm extends from the first side of the through hole in a direction departing from the bottom wall;

after the pin enters the through hole, both the pair of the sidewall and the first elastic arm are in contact with the pin.

Embodiment 1

Figure 2A:
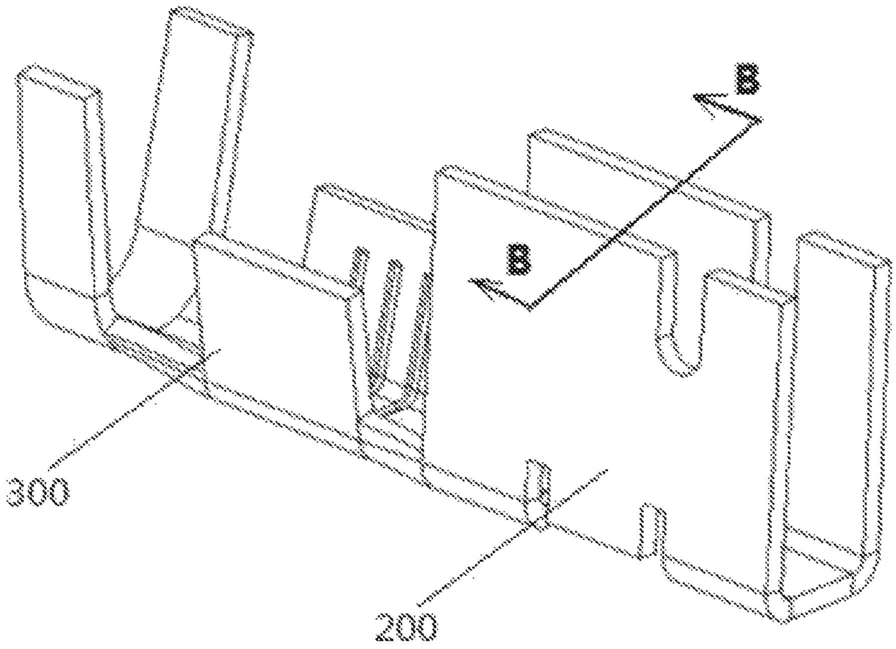
FIG. 2*a* is a perspective view of a terminal according to a first embodiment.
Figure 2B:
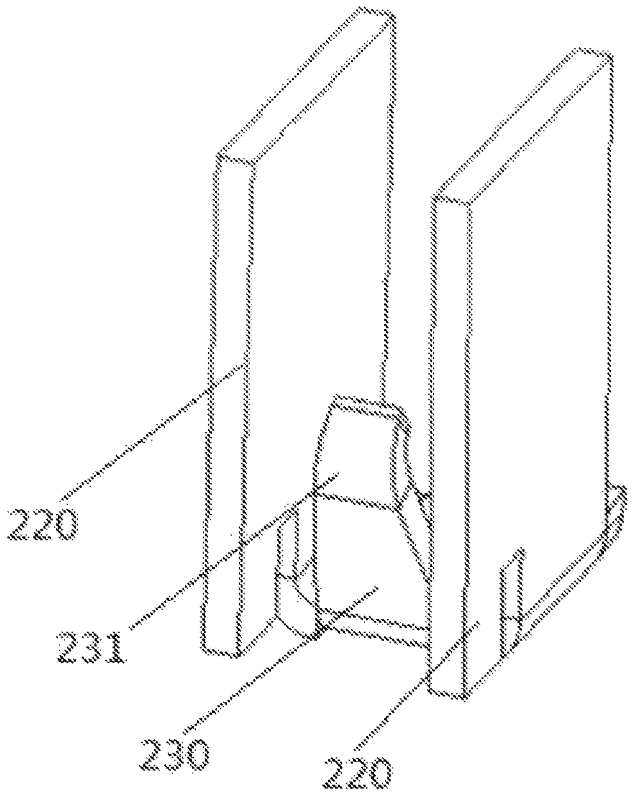
FIG. 2*b* is a sectional perspective view of the terminal of FIG. 2*a;*
Figure 2C:
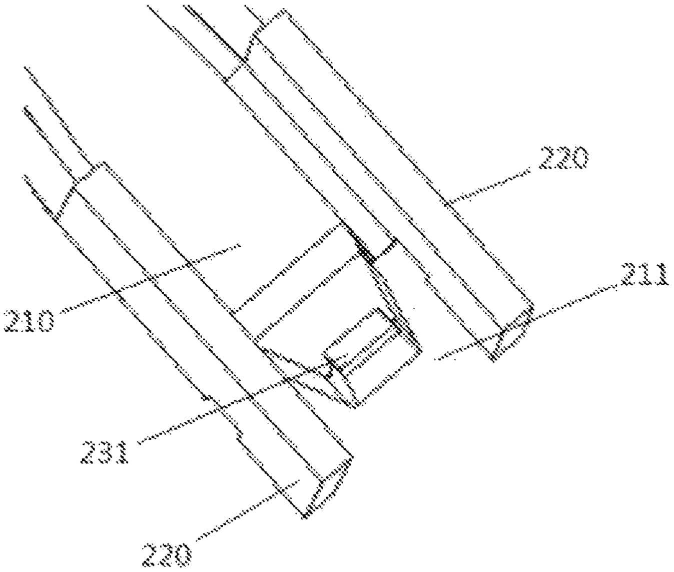
FIG. 2*c* is another sectional perspective view of the terminal of FIG. 2*a;*

FIGS. 2*a*-2*d* disclose a first example of a terminal of the present disclosure. As shown in FIG. 2*a*, the terminal includes a crimping portion 300 and a socket portion 200. FIG. 2*b* shows a partial view of the terminal shown in FIG. 2*a* taken along the B-B direction. According to FIGS. 2*b* and 2*c*, the socket portion 200 includes a bottom wall 210, a pair of sidewalls 220 and a first elastic arm 230. An end of the bottom wall 210 is coupled to the crimping portion 300, and the bottom wall 210 is provided with a through hole 211. The pair of sidewalls 220 are disposed on both sides of the bottom wall 210 respectively, a first elastic arm 230 extends from a first side of the through hole 211 in a direction departing from the bottom wall 210, wherein the first side of the through hole 211 is close to the crimping portion 300.

Figure 2D:
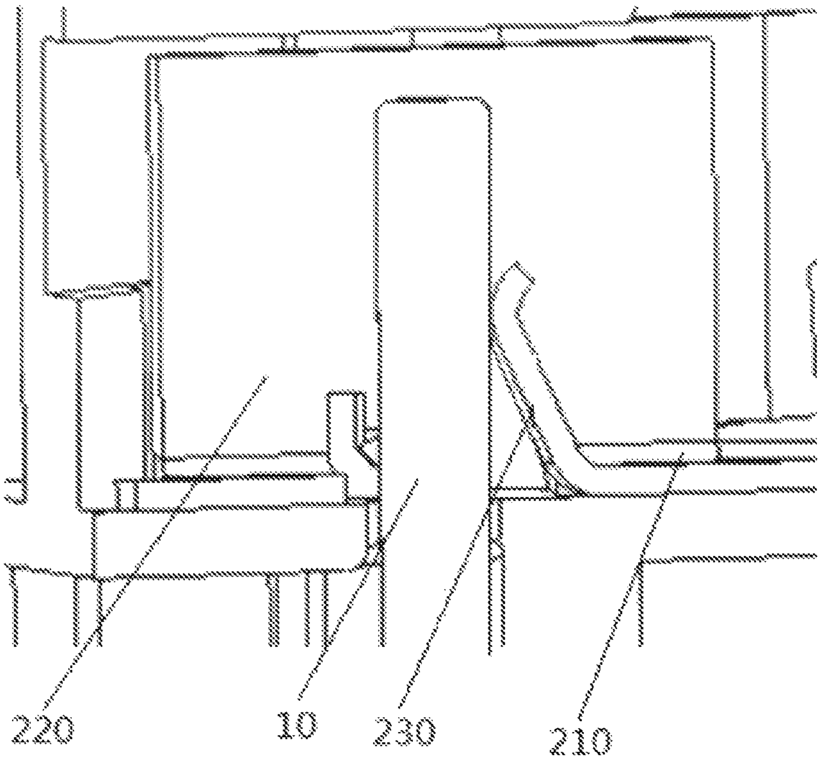
FIG. 2*d* is a sectional perspective view of the terminal of FIG. 2*a* with a pin in the terminal.

As shown in FIG. 2*d*, after the pin 10 enters the through hole 211, both the pair of sidewalls 220 and the first elastic arm 230 are in contact with the pin 10 such that the pin 10 is electrically coupled with and disposed in the terminal.

In view of the requirement to reduce the manufacturing cost (for example, the manufacturing material of the terminal becomes thinner), the structure of the terminal disclosed in this embodiment can effectively prevent the occurrence of the problem that the mechanical properties of the terminal are degraded due to changes in the manufacturing material.

Embodiment 2

Figure 3A:
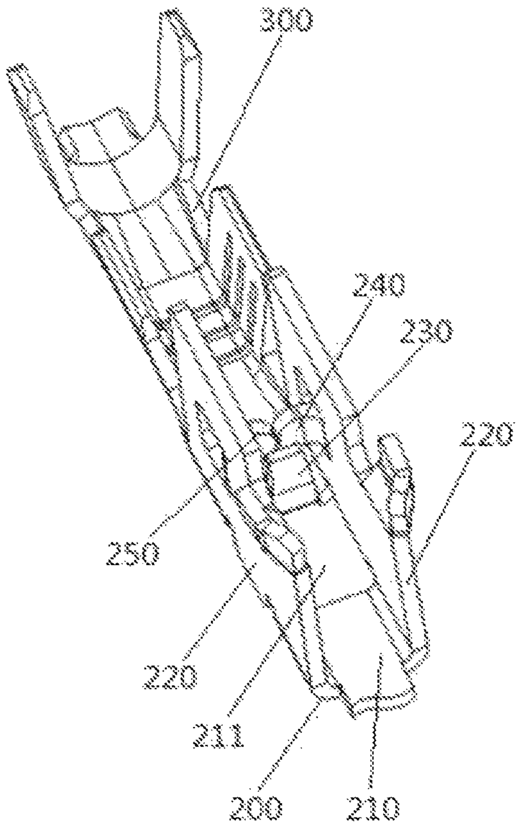
FIG. 3*a* is a perspective view of a terminal according to a second embodiment.
Figure 3B:
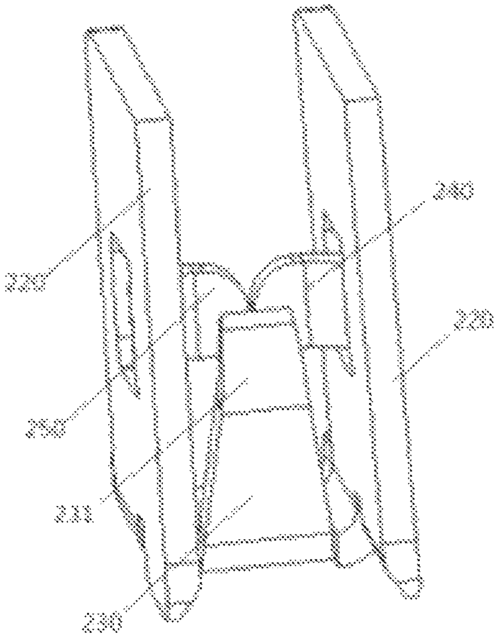
FIG. 3*b* is a sectional perspective of the terminal of FIG. 3*a;*
Figure 3C:
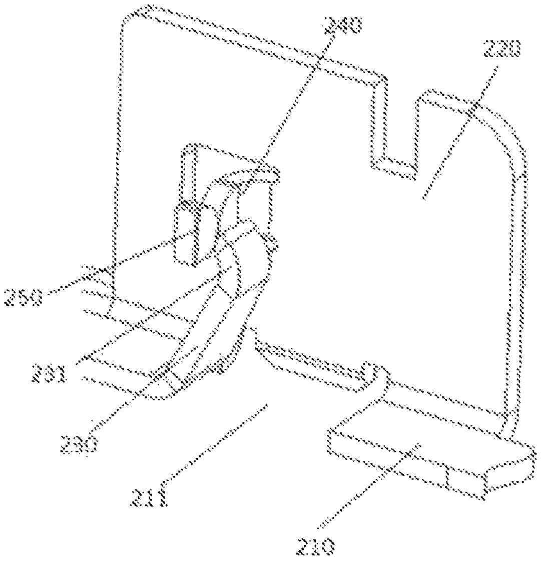
FIG. 3*c* is another sectional perspective view of the terminal of FIG. 3*a;*
Figure 4A:
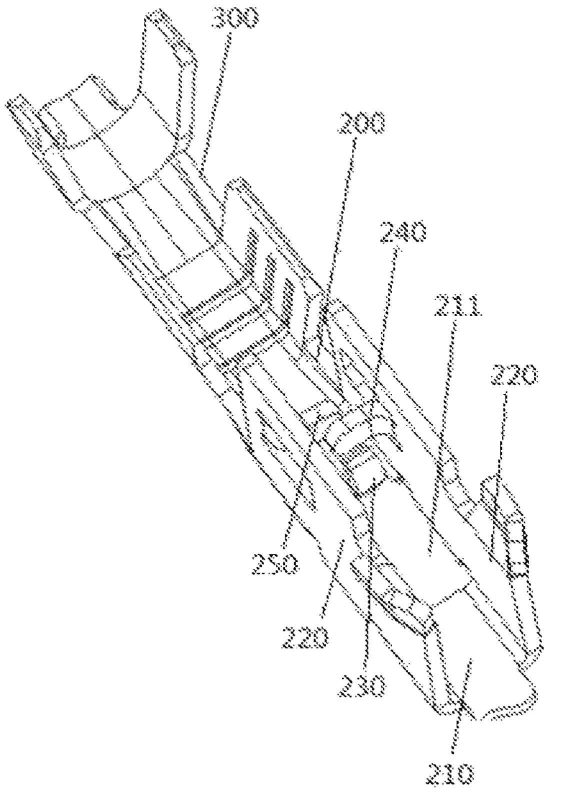
FIG. 4*a* is a perspective view of a terminal according to a third embodiment.
Figure 4B:
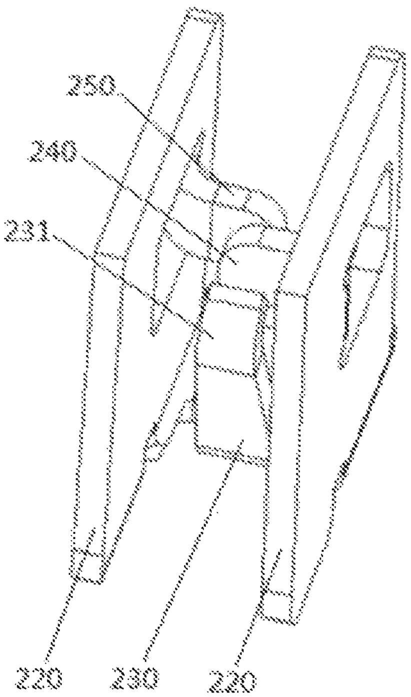
FIG. 4*b* is a sectional perspective view of the terminal of FIG. 4*a;*
Figure 4C:
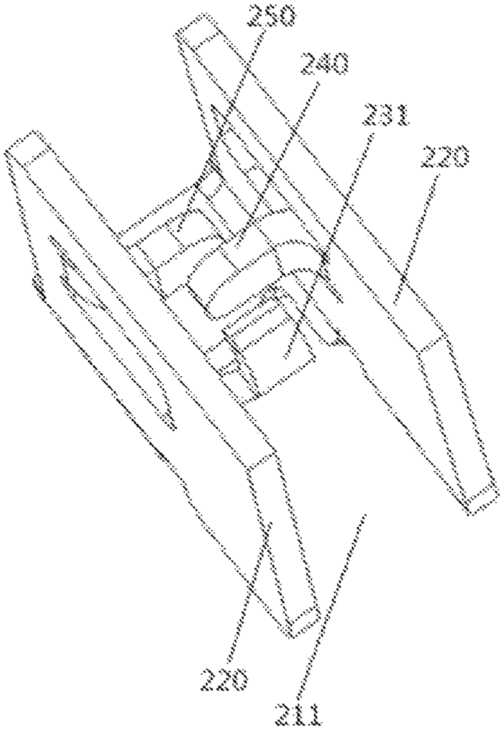
FIG. 4*c* is another sectional perspective view of the terminal of FIG. 4*a;*
Figure 4D:
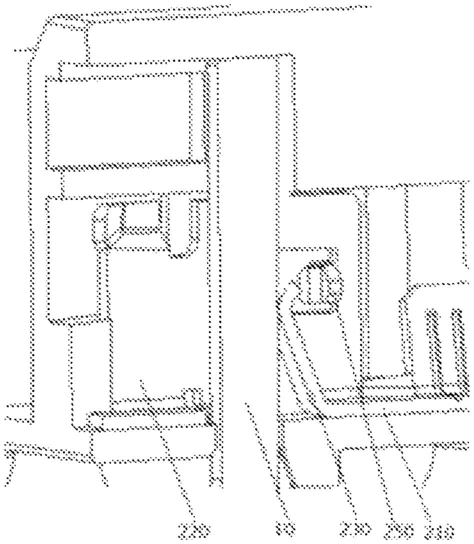
FIG. 4*d* is a sectional perspective view of the terminal of FIG. 4*a* with a pin in the terminal.

As shown in FIGS. 3*a*-3*c*, the present embodiment discloses a second example of a terminal. In this embodiment, the socket portion 200 of the terminal further includes a first holding member 240 and a second holding member 250. The first holding member 240 extends from one sidewall 220 to the other sidewall 220, and a first gap exists between the first holding member 240 and the movable end 231 of the first elastic arm 230 in the direction in which the socket portion 200 is coupled to the crimping portion 300. The second holding member 250 extends from the other sidewall 220 towards the above sidewall 220. In this embodiment, the first holding member 240 and the second holding member 250 are configured to limit the moving distance of the movable end 231 of the first elastic arm 230.

In this embodiment, a first gap also exists between the second holding member 250 and the movable end 231 of the first elastic arm 230 in the direction in which the socket portion 200 is coupled with the crimping portion 300 such that the first holding member 240 and the second holding member 250 are disposed opposite to each other. After the pin 10 enters the through hole 211, the maximum moving displacement of the movable end 231 of the first elastic arm 230 depends on the first gap and the holding force of the first holding member 240 and the holding force of the second holding member 250.

Compared to Embodiment 1, the present embodiment can further improve the stability of the electrical coupling between the pin 10 and the terminal, and improve the use strength of the terminal itself.

Embodiment 3

As shown in FIGS. 4*a*-4*d*, the present embodiment discloses a third example of a terminal. In this embodiment, the components included in the socket portion of the terminal are similar to those in Embodiment 2, and are not repeated here. In the present embodiment, a second gap exists between the second holding member 250 and the first holding member 240 in the direction in which the socket portion 200 is coupled with the crimping portion 300. After the pin 10 enters the through hole 211, the movable end 231 of the first elastic arm 230 first moves to contact with the first holding member 240, and then the first holding member 240 is in contact with the second holding member 250 as the movable end 231 of the first elastic arm 230 moves.

In this embodiment, the maximum moving displacement of the movable end 231 of the first elastic arm 230 depends on the first gap, the second gap, the holding force of the first holding member 240 and the holding force of the second holding member 250. Compared to Embodiment 2, the present embodiment can further reduce the size of the terminal, and maintain stable electrical coupling between the pin 10 and the terminal in the case of reducing the size of the terminal.

Embodiment 4

Figure 5A:
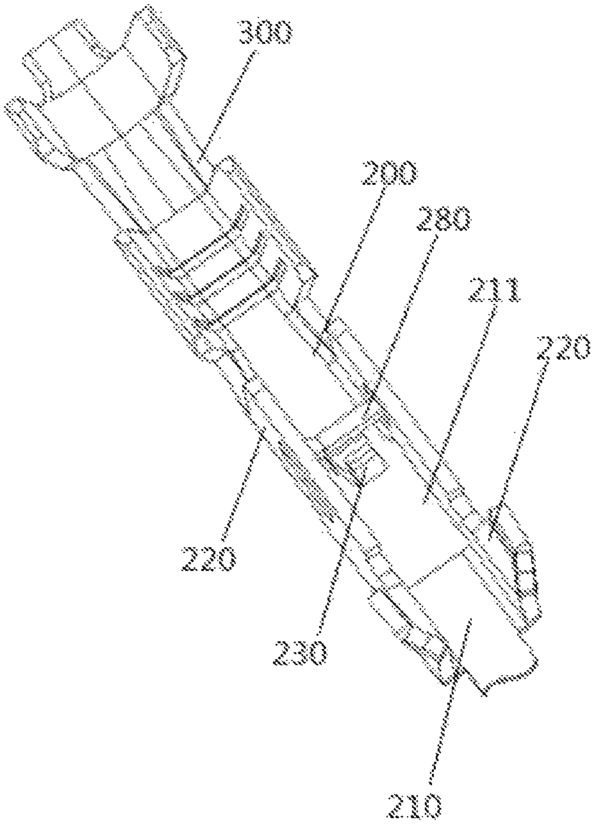
FIG. 5*a* is a perspective view of a terminal according to a fourth embodiment.
Figure 5B:
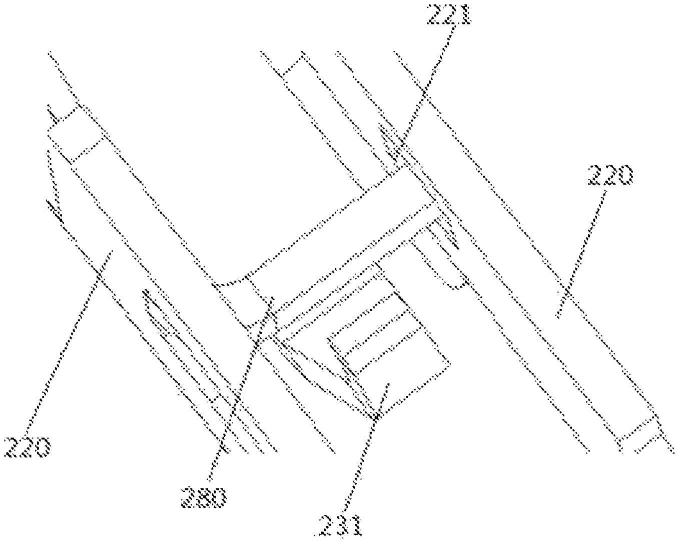
FIG. 5*b* is a sectional perspective view of the terminal of FIG. 5*a;*

As shown in FIGS. 5*a* and 5*b*, the terminal disclosed in this embodiment includes a crimping portion 300 and a socket portion 200. Compared to Embodiment 1, the socket portion 200 of the terminal in this embodiment further includes a holding member 280 and a seating hole 221. Specifically, the holding member 280 extends from the sidewall toward the other sidewall 220, and a first gap exists between the holding member 280 and the movable end 231 of the first elastic arm 230 in the direction in which the socket portion 200 is coupled with the crimping portion 300. In this embodiment, the holding member 280 is configured to limit the moving distance of the movable end 231 of the first elastic arm 230. The seating hole 221 is disposed in the other sidewall 220 such that the holding member 280 extends from one sidewall 220 into the seating hole 221 of the other sidewall 220.

In this embodiment, after the pin 10 enters the through hole 211, the maximum moving displacement of the movable end 231 of the first elastic arm 230 depends on the first gap and the holding force of the holding member 280.

Compared to Embodiment 2 and Embodiment 3, the present embodiment can adopt another way to improve the stability of the electrical coupling between the pin 10 and the terminal, and improve the use strength of the terminal itself.

Embodiment 5

Figure 6:
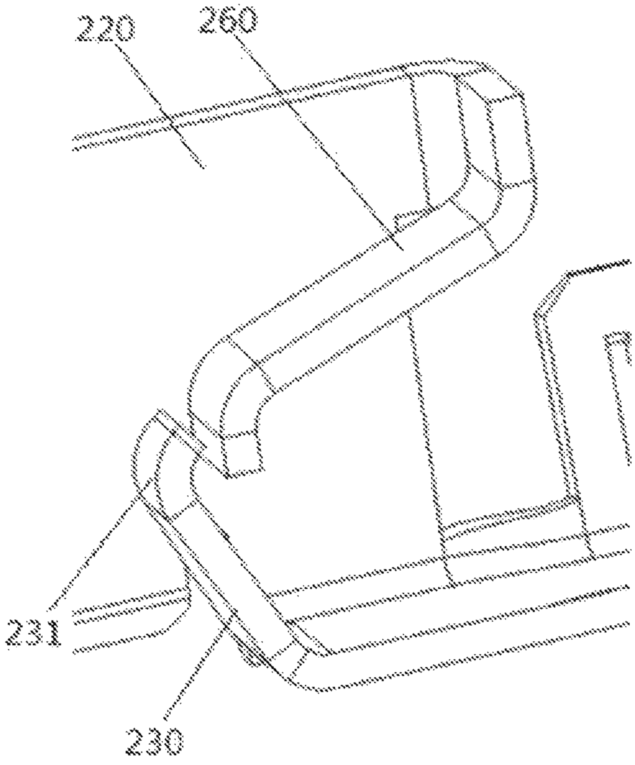
FIG. 6 is a sectional perspective view of a terminal according to a fifth embodiment.

FIG. 6 discloses a partial view of another implementation of a terminal. Compared to Embodiment 1, the socket portion 200 of the terminal in this embodiment further includes a second elastic arm 260. The second elastic arm 260 extends from the top of the sidewall 220 near the crimping portion 300 toward the bottom wall 210.

In this embodiment, after the pin 10 enters the through hole 211, the pair of sidewalls 220 and the first elastic arm 230 are in contact with the pin 10, and the second elastic arm 260 limits the moving distance of the movable end 231 of the first elastic arm 230 such that the pin 10 is stably electrically coupled with and disposed in the terminal.

A first gap exists between the movable end of the second elastic arm 260 and the movable end 231 of the first elastic arm 230 in the direction in which the socket portion 200 is coupled to the crimping portion 300, and after the pin 10 enters the through hole 211, the maximum moving displacement of the movable end 231 of the first elastic arm 230 depends on the first gap and the holding force of the second elastic arm 260.

The present embodiment adopts another way to effectively prevent the occurrence of the problem that the mechanical properties of the terminals are degraded due to changes in manufacturing materials.

Embodiment 6

Figure 7:
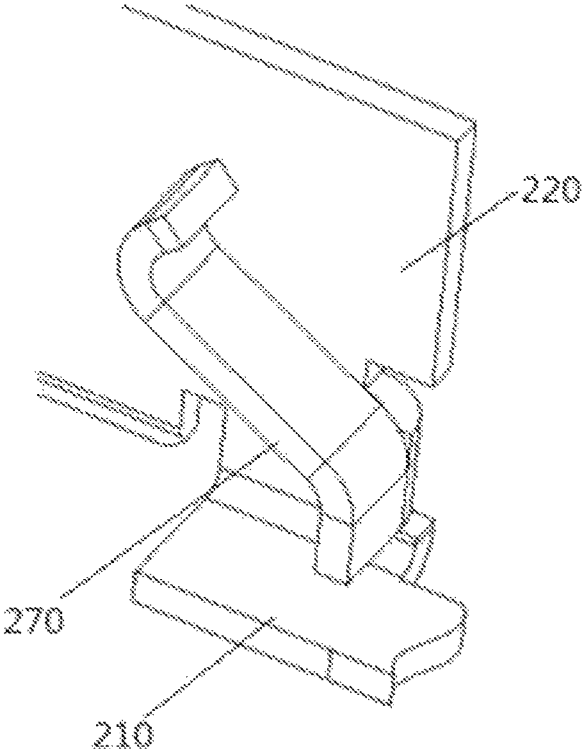
FIG. 7 is a sectional perspective view of a terminal according to a sixth embodiment.

FIG. 7 shows a partial view of the socket portion of the terminal of the sixth example. Compared to Embodiment 1, the socket portion in the present embodiment further includes a third elastic arm 270 in this example. Specifically, the third elastic arm 270 extends from the bottom of the sidewall 220 away from the crimping portion 300 in a direction departing from the bottom wall 210.

After the pin enters the through hole 211, the pair of sidewalls 220, the first elastic arm 230, and the third elastic arm 270 are in contact with the pin such that the pin is electrically coupled with and disposed in the terminal.

The terminal disclosed in the present embodiment can further improve the contact area between the pin and the terminal and the electrical coupling stability.

Embodiment 7

Figure 8A:
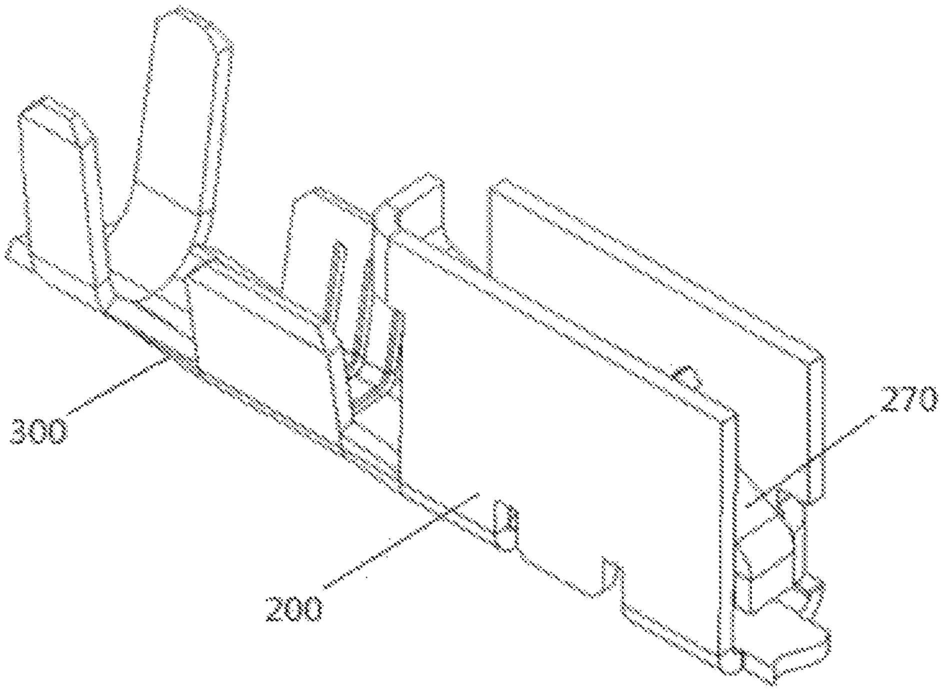
FIG. 8*a* is a perspective view of a terminal according to a seventh embodiment.
Figure 8B:
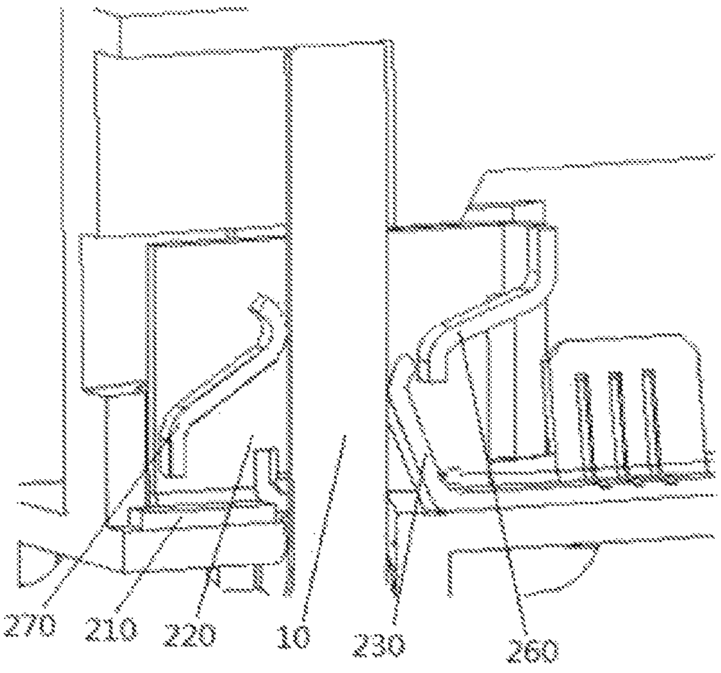
FIG. 8*b* is a sectional perspective view of the terminal of FIG. 8*a* with a pin in the terminal.
Figure 8C:
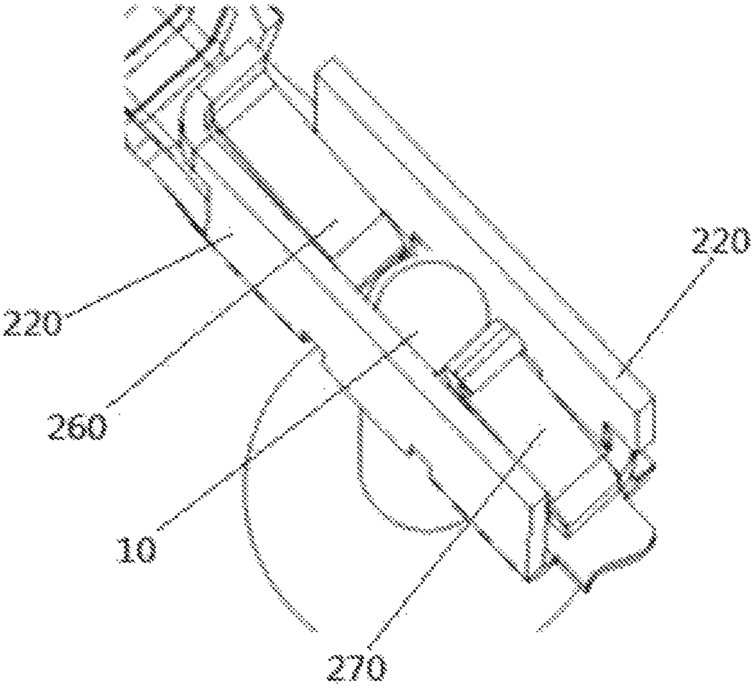
FIG. 8*c* is another sectional perspective view of the terminal of FIG. 8*a* with the pin in the terminal.

FIGS. 8*a*-8*c* show the terminal of Embodiment 7, compared to Embodiment 1, the socket portion further includes a second elastic arm 260 and a third elastic arm 270. Specifically, the second elastic arm 260 extends from the top of the sidewall 220 near the crimping portion 300 toward the bottom wall 210. The third elastic arm 270 extends from the bottom of the sidewall 220 away from the crimping portion 300 in a direction departing from the bottom wall 210.

After the pin 10 enters the through hole 211, the pair of sidewalls 220, the first elastic arm 230, and the third elastic arm 270 are in contact with the pin 10, and the second elastic arm 260 limits the moving distance of the movable end 231 of the first elastic arm 230 such that the pin 10 is electrically coupled with and disposed in the terminal.

In this embodiment, a first gap exists between the movable end of the second elastic arm 260 and the movable end 231 of the first elastic arm 230 in the direction in which the socket portion 200 is coupled with the crimping portion 300, the maximum moving displacement of the movable end of the first elastic arm 230 depends on the first gap and the holding force of the second elastic arm 260.

Compared to Embodiment 7, the terminal disclosed in the present embodiment has better use strength, which improves the life of the connection terminal.

Embodiment 8

Figure 9A:
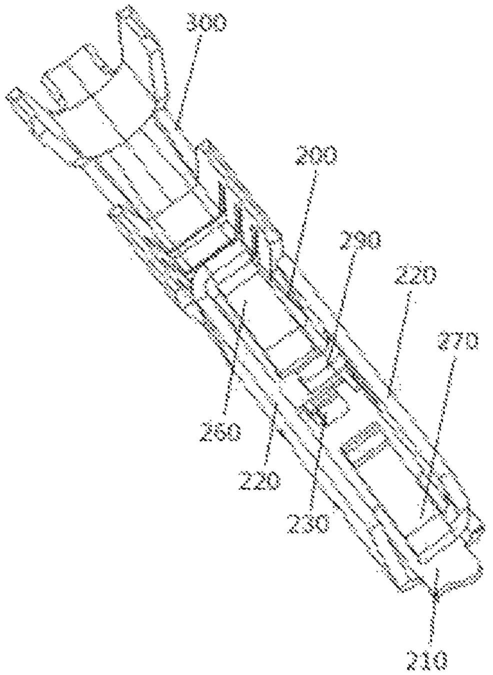
FIG. 9*a* is a perspective view of a terminal according to an eighth embodiment.
Figure 9B:
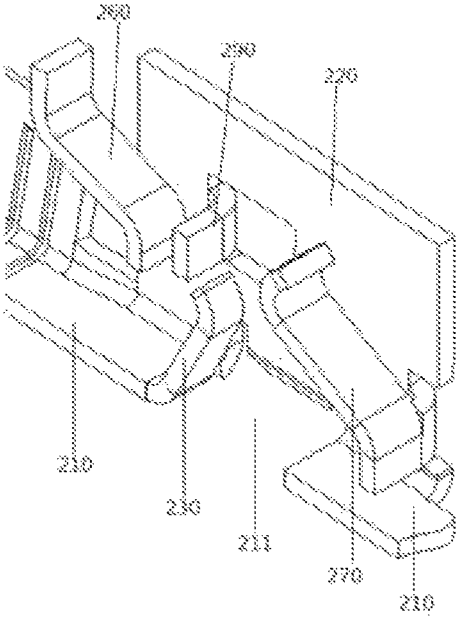
FIG. 9*b* is a sectional perspective view of the terminal of FIG. 9*a;*
Figure 9C:
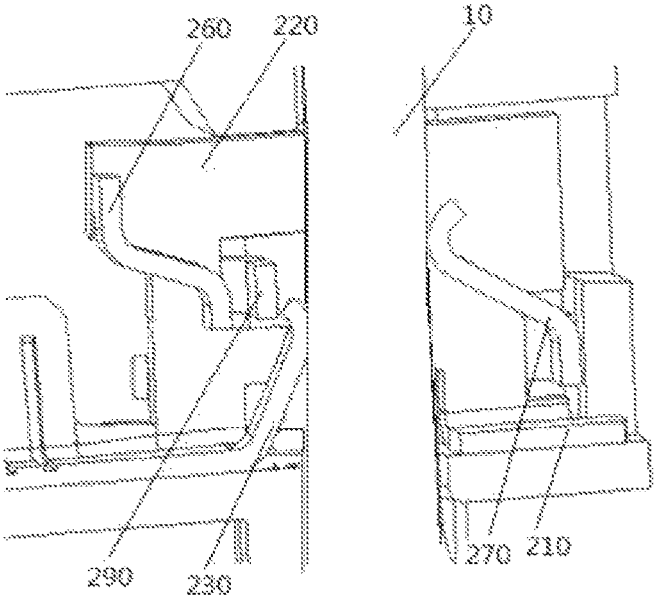
FIG. 9*c* is a sectional perspective view of the terminal of FIG. 9*a* with a pin in the terminal.

FIGS. 9*a*-9*c* show the terminal of Embodiment 7, compared to Embodiment 1, the socket portion further includes a second elastic arm 260, a holding member 290 and a third elastic arm 270. Specifically, the second elastic arm 260 extends from the top of the sidewall 220 near the crimping portion 300 toward the bottom wall 210, the holding member 290 extends from the other sidewall 220 toward the sidewall 220; the third elastic arm 270 extends from the bottom of one sidewall 220 away from the crimping portion 300 toward the top of the sidewall 220.

In the present embodiment, the second elastic arm 260 and the holding member 290 are configured to limit the moving distance of the movable end 231 of the first elastic arm 230. After the pin 10 enters the through hole 211, at least a pair of sidewalls 220, the first elastic arm 230, and the third elastic arm 270 are in contact with the pin 10 such that the pin 10 is electrically coupled with and disposed in the terminal.

In the present embodiment, a first gap exists between the second elastic arm 260 and the movable end 231 of the first elastic arm 230 or between the holding member 290 and the movable end 231 of the first elastic arm 230 in the direction in which the socket portion 200 is coupled with the crimping portion 300, a second gap exists between the holding member 290 and the second elastic arm 260 in the direction in which the socket portion 200 is coupled with the crimping portion 300.

As shown in FIGS. 9*a*-9*c*, a first gap exists between the holding member 290 and the movable end 231 of the first elastic arm 230 in the direction in which the socket portion 200 is coupled with the crimping portion 300, a second gap exists between the holding member 290 and the second elastic arm 260 in the direction in which the socket portion 200 is coupled with the crimping portion 300. When the pin 10 enters the through hole 211, the movable end 231 of the first elastic arm 230 first moves to contact with the holding member 290, and the holding member 290 is in contact with the second elastic arm 260 as the movable end 231 of the first elastic arm 230 moves.

In addition, in other examples, optionally, a first gap exists between the second elastic arm 260 and the movable end 231 of the first elastic arm 230 in the direction in which the socket portion 200 is coupled with the crimping portion 300, a second gap exists between the holding member 290 and the second elastic arm 260 in the direction in which the socket portion 200 is coupled with the crimping portion 300. When the pin 10 enters the through hole 211, the movable end 231 of the first elastic arm 230 first moves to contact with the second elastic arm 260, and then the second elastic arm 260 is in contact with the holding member 290 as the movable end 231 of the first elastic arm 230 moves.

Alternatively, first gaps exist between the second elastic arm 260 and the movable end 231 of the first elastic arm 230 and between the holding member 290 and the movable end 231 of the first elastic arm 230 in the direction in which the socket portion 200 is coupled with the crimping portion 300, that is the second elastic arm 260 is disposed opposite to the holding member 290. In this configuration, when the pin 10 enters the through hole 211, the maximum moving displacement of the movable end 231 of the first elastic arm 230 depends on the first gap, the holding force of the second elastic arm 260 and the holding force of the holding member 290.

The terminal disclosed in the present embodiment can flexibly provide the second elastic arm and the holding member according to the needs of use to further expand the use range of the terminal.

Embodiment 9

Compared to Embodiment 1, the terminal-connected socket portion 200 disclosed in this example further includes a second elastic arm 260 and a holding member 290. Specifically, the second elastic arm 260 extends from the top of the sidewall 220 near the crimping portion 300 toward the bottom wall 210, and the holding member 290 extends from the other sidewall 220 toward the sidewall 220. The second elastic arm 260 and the holding member 290 are configured to limit the moving distance of the movable end 231 of the first elastic arm 230.

Optionally, first gaps exist between the second elastic arm 260 and the movable end 231 of the first elastic arm 230 and between the holding member 290 and the movable end 231 of the first elastic arm 230 in the direction in which the socket portion 200 is coupled with the crimping portion 300, that is, the second elastic arm 260 is disposed opposite to the holding member 290. In this configuration, when the pin 10 enters the through hole 211, the maximum moving displacement of the movable end 231 of the first elastic arm 230 depends on the first gap, the holding force of the second elastic arm 260 and the holding force of the holding member 290.

Alternatively, a first gap exists between the second elastic arm 260 and the movable end 231 of the first elastic arm 230 or between the holding member 290 and the movable end 231 of the first elastic arm 230 in the direction in which the socket portion 200 is coupled with the crimping portion 300, a second gap exists between the holding member 290 and the second elastic arm 260 in the direction in which the socket portion 200 is coupled with the crimping portion 300. When the pin 10 enters the through hole 211, the movable end 231 of the first elastic arm 230 first moves to contact with the second elastic arm 260 or the holding member 290, and then the second elastic arm 260 is in contact with the holding member 290 as the movable end 231 of the first elastic arm 230 moves. In this configuration, the maximum moving displacement of the movable end 231 of the first elastic arm 230 depends on the first gap, the second gap, the holding force of the holding member 290 and the holding force of the second elastic arm 260.

Embodiment 10

Compared to Embodiment 1, the terminal-connected socket portion 200 disclosed in this example further includes a pair of second elastic arms 260, each second elastic arm 260 extends from the top of the corresponding sidewall 220 near the crimping portion 300 toward the bottom wall 210 and is configured to limit the moving distance of the movable end 231 of the first elastic arm 230.

Specifically, a first gap exists between the pair of second elastic arms 260 and the movable end 231 of the first elastic arm 230 in the direction in which the socket portion 200 is coupled with the crimping portion 300 such that the pair of second elastic arms 230 are disposed opposite to each other; after the pin 10 enters the through hole 211, the maximum moving displacement of the movable end 231 of the first elastic arm 230 depends on the first gap and the holding forces of the pair of second elastic arms 260.

The first gap described in Embodiments 1-10 depends on the cross-sectional diameter of the pin 10.

The terminals disclosed herein can take different forms to maintain or even improve the electrical and mechanical properties of the terminals in the case of reducing the cost of their manufacturing materials, and further improve the life and flexibility of use of the terminals.

In the aforementioned exemplary embodiments of the present disclosure, compared to the existing terminals, the overall size of the terminal is reduced, the manufacturing cost is reduced, and the contact area between the pin and the terminal is increased, the current transmission paths are increased, and the contact stability between the pin and the terminal is further improved.

Embodiment 11

Figure 10A:
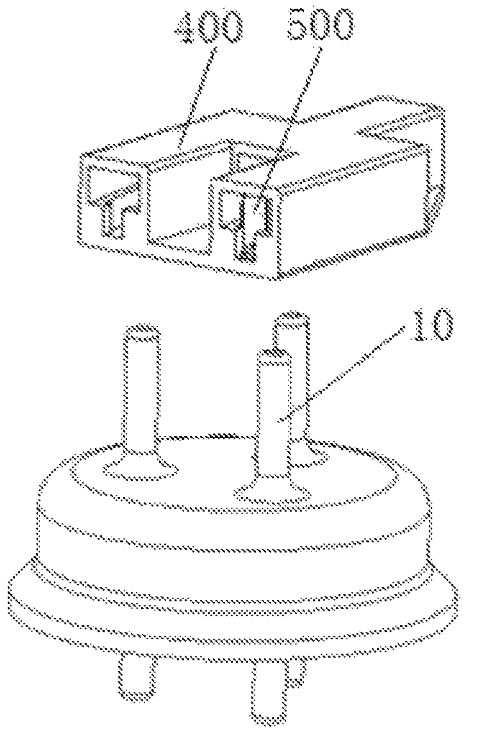
FIG. 10*a* is an exploded perspective view of a connector according to an embodiment.
Figure 10B:
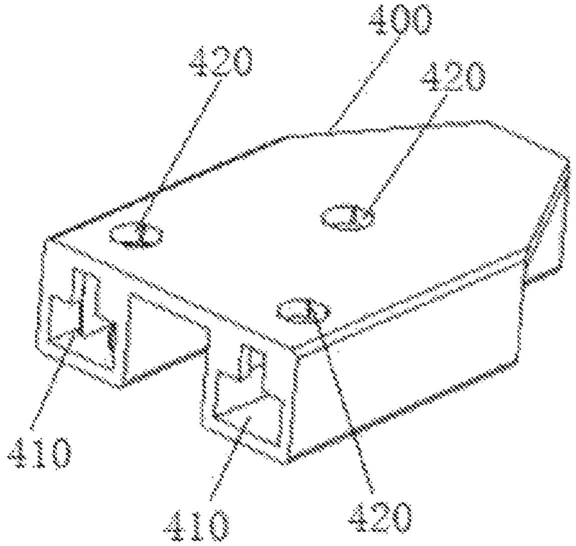
FIG. 10*b* is a perspective view of a housing of the connector of FIG. 10*a*.

FIGS. 10*a* and 10*b* illustrate specific application scenarios of the connectors disclosed herein. In this embodiment, the connector includes a housing 400 and a terminal 500 disposed in the housing 400, and the terminal 500 in the present embodiment is the terminal disclosed in any of Embodiments 1-10. The housing 400 is provided with an accommodating cavity 410 and a socket 420 for inserting the pin 10 therein, such that the terminal 500 is disposed in the accommodating cavity 410. After the terminal 500 is installed in the housing 400 and the pin 10 is inserted into the socket 420, the pin 10 passes through the through hole of the terminal 500 and is in mating contact with a pair of sidewalls and the first elastic arm. Thereby, the insertion of the connector with the corresponding pin is implemented.

It should be noted that although several devices or sub-devices of the apparatus are mentioned in the above detailed description, this division is merely exemplary and not mandatory. Indeed, according to embodiments of the present disclosure, the features and functions of the two or more devices described above may be embodied in one device. Conversely, the features and functions of one apparatus described above may be further divided into being embodied by multiple apparatuses.

The above mentioned is only an alternative embodiment of the embodiments of the present disclosure, and is not intended to limit the embodiments of the present disclosure. To a person skilled in the art, various modifications and changes can be made to the embodiments of the present disclosure. Any modifications, equivalent substitutions, improvements, etc. within the spirit and scope of the embodiments of the present disclosure are intended to be included within the scope of the embodiments of the present disclosure.

While the embodiments of the present disclosure have been described with reference to the several specific embodiments, it is understood that the embodiments of the present disclosure are not limited to the specific embodiments disclosed. The embodiments of the present disclosure are intended to cover various modifications and equivalents included in the spirit and scope of the appended claims. The scope of the appended claims is in accord with the broadest interpretation, thus including all such modifications and equivalent structures and functions.

What is claimed is:

1. A terminal, comprising:

a bottom wall having a through hole;

a crimping portion located on the bottom wall that is capable of crimping a cable;

a pair of sidewalls disposed on a pair of sides of the bottom wall;

a first elastic arm extending from a first side of the through hole in a direction away from the bottom wall, the sidewalls and the first elastic arm contact a pin inserted into the through hole; and a holding member extending from one of the sidewalls toward the other of the sidewalls, the holding member limits a moving distance of a movable end of the first elastic arm, a first gap is between the holding member and the movable end of the first elastic arm in a direction in which the bottom wall is coupled to the crimping portion.

2. The terminal of claim 1, wherein the other of the sidewalls has a seating hole, the holding member extends into the seating hole.

3. The terminal of claim 2, wherein the first gap depends on a cross-sectional diameter of the pin.

4. The terminal of claim 1, wherein the holding member is a first holding member, and further comprising a second holding member extending from the other of the sidewalls toward the one of the sidewalls, the first holding member and the second holding member limit the moving distance of the movable end of the first elastic arm.

5. The terminal of claim 4, wherein the first holding member and the second holding member are disposed opposite to each other, and after the pin enters the through hole, a maximum moving displacement of the movable end of the first elastic arm depends on the first gap and holding forces of the first holding member and the second holding member.

6. The terminal of claim 4, wherein a second gap is between the first holding member and the second holding member in a direction in which the bottom wall is coupled to the crimping portion, after the pin enters the through hole, the movable end of the first elastic arm first moves to contact the first holding member and then the first holding member contacts the second holding member as the movable end of the first elastic arm moves, a maximum moving displacement of the movable end of the first elastic arm depends on the first gap, the second gap, a holding force of the first holding member, and a holding force of the second holding member.

7. The terminal of claim 1, further comprising a second elastic arm extending from a top of one of the sidewalls near the crimping portion toward the bottom wall, the second elastic arm and the holding member limit the moving distance of the movable end of the first elastic arm.

8. The terminal of claim 7, wherein the first gap exists between the second elastic arm and the movable end of the first elastic arm, and between the holding member and the movable end of the first elastic arm in a direction in which the bottom wall is coupled to the crimping portion, the second elastic arm is disposed opposite to the holding member, after the pin enters the through hole, a maximum moving displacement of the movable end of the first elastic arm depends on the first gaps and holding forces of the second elastic arm and the holding member.

9. The terminal of claim 7, wherein a second gap exists between the holding member and the second elastic arm in the direction in which the bottom wall is coupled to the crimping portion, after the pin enters the through hole, the movable end of the first elastic arm first moves to contact the second elastic arm or the holding member, and then the holding member and the second elastic arm are in contact with each other as the movable end of the first elastic arm moves, a maximum moving displacement of the movable end of the first elastic arm depends on the first gap, the second gap, a holding force of the holding member, and a holding force of the second elastic arm.

10. The terminal of claim 8, further comprising a third elastic arm extending from a bottom of the sidewall away from the crimping portion toward the top of the sidewall, after the pin enters the through hole, at least the pair of sidewalls, the first elastic arm, and the third elastic arm are in contact with the pin, the pin is electrically coupled to and disposed in the terminal.

11. A connector comprising:

a housing having an accommodating cavity and a socket; and a terminal disposed in the accommodating cavity, the terminal including a bottom wall, a crimping portion located on the bottom wall that is capable of crimping a cable, a pair of sidewalls, a first elastic arm, and a holding member, the bottom wall has a through hole, the pair of sidewalls are disposed on a pair of sides of the bottom wall, the first elastic arm extends from a first side of the through hole in a direction away from the bottom wall, the holding member extends from one of the sidewalls toward the other of the sidewalls, the holding member limits a moving distance of a movable end of the first elastic arm, a first gap is between the holding member and the movable end of the first elastic arm in a direction in which the bottom wall is coupled to the crimping portion, after a pin is inserted into the socket, the pin passes through the through hole and is in contact with the pair of sidewalls and the first elastic arm.

* * * * *